March 5, 1935.  K. E. STUART  1,993,421
ABSORPTION PROCESS FOR GASES
Filed April 18, 1932
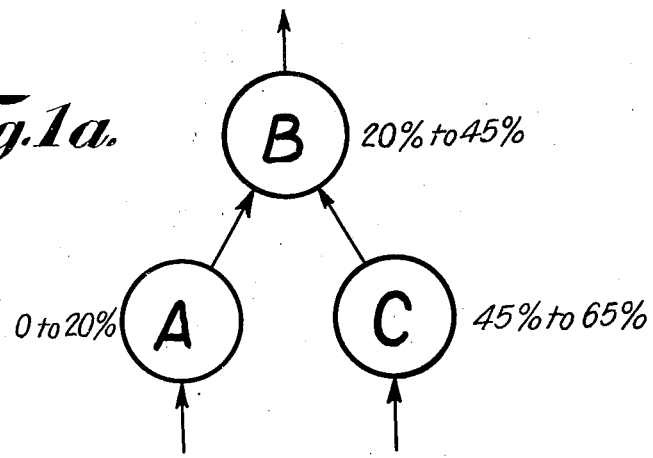
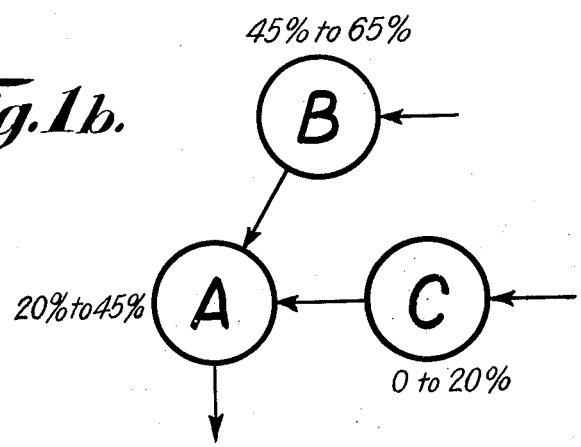
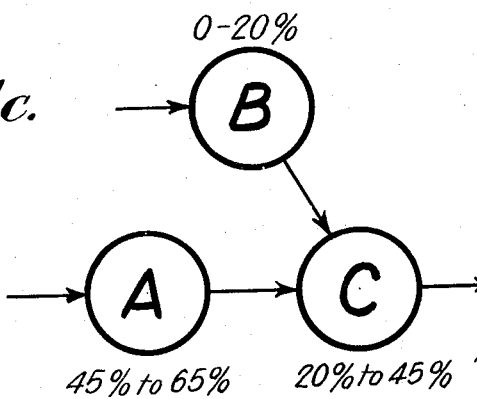
INVENTOR
Kenneth E. Stuart
BY
Edwards, Bower Pool
ATTORNEY Patented Mar. 5, 1935

1,993,421

UNITED STATES PATENT OFFICE 1,993,421

ABSORPTION PROCESS FOR GASES

Kenneth E. Stuart, Niagara Falls, N. Y., assignor to Hooker Electrochemical Company, Niagara Falls, N. Y., a corporation of New York Application April 18, 1932, Serial No. 606,065

11 Claims. (Cl. 260—99.12)

This invention relates to the treatment of gases by absorption as illustrated for instance by the absorption of olefines in an acid such as sulfuric acid.

The object of the invention is to provide a process which will give a very thorough absorption at relative small cost in operation and in the apparatus required.

Another object of the invention is to provide a process utilizing high pressure so as to decrease the size of the apparatus.

Still further objects of the invention particularly in the details of the apparatus and treatments involved will appear from the following specification taken in connection with the accompanying drawing in which Figs. 1ª, 1ᵇ and 1ᶜ are diagrammatic views illustrating the operation of the absorption apparatus as typically used in the absorption of ethylene in sulfuric acid.

Ethylene is made commercially available in connection, for instance, with the purification and cracking of hydrocarbon oils, and it is frequently in admixture with other gases. It will be assumed in the present process that the starting material is 30% to 35% ethylene with 70% to 65% of other gases, such as methane and ethane. These other gases are saturated compounds while the ethylene is unsaturated and reactive with reagents, such as sulfuric acid, toward which the methane and ethane are inert. Consequently, by proper treatment with sulfuric acid the ethylene may be absorbed and separated from the inert gases which are passed on and discharged.

In the process of this invention the absorption of the ethylene is carried to the point of strong concentration of the resulting liquor which is an ethylated sulfuric acid in which the amount of combined ethylene is in the ratio of 0.8 mol. or more of ethylene per mol. of $SO_3$ present in any form, the ratio being preferably about 1.25 mol. $C_2H_4$ per mol. of $SO_3$. Such an ethylated sulfuric acid consists essentially of a mixture of sulfuric acid, ethyl sulfuric acid and diethyl sulfate in proportions which may vary within wide limits without affecting the utility of the product for the subsequent operations.

As outlined diagrammatically in Figs. 1ª, 1ᵇ and 1ᶜ the gas supply is divided into two parts generally equal and each containing approximately 30% ethylene to 70% inert gases, and these parts are passed into the two towers A, C containing sulfuric acid of suitable strength, the acid of tower A at first having no absorbed ethylene and the acid of tower C ethylated to about .9 mol. $C_2H_4$ per mol. of $SO_3$, that is, 45% of two mols. of ethylene per mol. of $SO_3$. Part of the continuous stream of ethylene is absorbed in the towers A, C progressively increasing the degree of saturation of the acid in each tower. The exit gas from towers A, C containing less ethylene than the original feed gas is passed through a third tower B to complete the removal of the ethylene from the gas, at the same time increasing the degree of saturation of the acid in tower B starting, for instance, from about 20% (.4 mol. $C_2H_4$ per mol. of $SO_3$) and continuing to about 45% (.9 mol. $C_2H_4$ per mol. of $SO_3$) while the saturation in tower A is increasing from zero to about 20% and that in tower C from 45% to 65% (1.3 mol. $C_2H_4$ per mol. of $SO_3$) approximately.

In this way the feed gas rich in ethylene is in contact with acids of relatively weak and relatively strong saturations while the exit gas containing less ethylene passes to tower B and is contacted with acid of intermediate saturation, which is relatively rapidly absorptive of ethylene and correspondingly effective in removing the ethylene essentially completely from the exit gases of towers A and C.

When the ethylated acid in tower C is fully saturated with all the ethylene which the acid will pick up under the existing conditions of temperature pressure and acid concentration and the exit gas from this tower shows essentially the same ethylene content as the feed gas, the saturated acid from the tower C is drained to a suitable receiver from which it is passed to the next operation. The tower C is then recharged with sulfuric acid and the feed gas is now run into towers B and C and the exit gas into tower A as indicated in Fig. 1ᵇ. Then when the acid of tower B reaches full saturation it is emptied and refilled and the feed of gas shifted to towers B and A with the exit gas passing to tower C as sketched in Fig. 1ᶜ, after which upon saturation and emptying of the acid in tower A the latter is refilled and the cycle of operations repeated.

The acid is handled batchwise while the flow of gas is essentially continuous. A fourth tower could be provided charged with sulfuric acid and ready to cut in whenever a tower is finished, and in this way three towers could be kept in practically continuous operation with constant flow of the feed gas and thorough absorption of the ethylene so that the exit gas is essentially free therefrom.

Preferably the acid is concentrated to a strength of 98% but may be as low as 93% H₂SO₄. The temperature of absorption is about 80° C. with toleration of 20° C. either way, and the absorption is carried on under pressure, for instance, 75 to 300 lbs. per square inch.

To give effective contact the preferred type of apparatus comprises a vertical tower or upright pipe containing the acid and with the feed gas entering through a diffuser plate of fine grain alundum or other suitable porous material located near the bottom of the tower. The gas is thereby divided into minute bubbles for more effective contact with the acid.

In the bubble tower absorption apparatus the rate of absorption is high and the scrubbing of the gas is complete. The simple construction avoids the use of moving parts, and in particular the batch-handling of the acid dispenses with any pumping of acid under pressure. The small bubbles formed at the high rate of injection of the gas through the bottom plate combined with the system utilizing the most efficient ethylated sulfuric acid for the final scrubbing gives a very concentrated final liquor in most desirable form for subsequent hydrolysis or other use as desired.

The essential of the process is the selective absorption of one gas out of a mixture of gases. As the mixture becomes progressively weaker, it is particularly desirable to finish the extraction of the selected gas by a scrubbing action at or near the optimum condition. It is applicable in any case in which the rate or completeness of absorption or reaction passes through an optimum at a point intermediate of the starting and finishing conditions, and the result is a very thorough selective action and the attainment of any degree of absorption desired in the final product.

I claim:

1. The process of forming ethylated sulfuric acid comprising continuously passing a gas containing ethylene in contact with a batch of sulfuric acid having a predetermined lower rate of absorption of ethylene and then passing the exit gases from said treatment in contact with another separate batch of sulfuric acid having a predetermined higher rate of absorption of ethylene to complete the extraction of ethylene from said gas and continuing said steps only until the first one of said acid batches contains approximately the percentage of ethylene that the second of said acid batches contained at the start of the operation, and then passing exit gases from a treatment at a lower rate of absorption in contact with said first mentioned batch.

2. The process of forming ethylated sulfuric acid comprising continuously passing a gas containing ethylene in contact with a batch of sulfuric acid having a predetermined lower rate of absorption of ethylene and then passing the exit gases from said treatment in contact with another separate batch of sulfuric acid having a predetermined higher rate of absorption of ethylene to complete the extraction of ethylene from said gas and continuing said steps only until the rates of absorption of the two acids approach within predetermined desired range of each other, and then passing exit gases from a treatment at a lower rate of absorption in contact with said first mentioned batch.

3. The process of forming ethylated sulfuric acid comprising passing gas containing ethylene into sulfuric acid ethylated to point of lower saturation and also simultaneously passing another portion of said gas into sulfuric acid ethylated to point of higher saturation, and then passing the exit gases from each of said treatments into contact with sulfuric acid ethylated to intermediate saturation, and continuing said steps until the rate of absorption of the acid of intermediate saturation decreases.

4. An absorption process for hydrocarbon gases having a mixture of constituents including an olefine comprising dividing the gas supply into parts, passing one part into a container having a liquid medium relatively slightly saturated with an absorbable olefine constituent of said mixture, passing another part into a container having a liquid medium relatively highly saturated with said constituent, and passing the exit gases from said treatments into a third container having a liquid medium saturated with said absorbable constituent to a point between said slight and high saturations.

5. An absorption process for hydrocarbon gases having a mixture of constituents including an olefine comprising dividing the gas supply into parts, passing one part into a container having a liquid medium relatively slightly saturated with an absorbable olefine constituent of said mixture, passing another part into a container having a liquid medium relatively highly saturated with said constituent, passing the exit gases from said treatments into a third container having a liquid medium saturated with said absorbable constituent to a point between said slight and high saturations, and continuing said process to constantly increase the saturations of each of said liquid mediums until one of said mediums reaches a predetermined degree of saturation.

6. An absorption process for hydrocarbon gases having a mixture of constituents including an olefine comprising dividing the gas supply into parts, passing one part into a container having a liquid medium relatively slightly saturated with an absorbable olefine constituent of said mixture, passing another part into a container having a liquid medium relatively highly saturated with said constituent, passing the exit gases from said treatments into a third container having a liquid medium saturated with said absorbable constituent to a point between said slight and high saturations, and continuing said process to constantly increase the saturations of each of said liquid mediums until said relatively highly saturated medium contains all of the absorbable constituent it will pick up under the existing conditions of temperature and pressure.

7. An absorption process for hydrocarbon gases having a mixture of constituents including an olefine comprising dividing the gas supply into parts, passing one part into a container having a liquid medium relatively slightly saturated with an absorbable olefine constituent of said mixture, passing another part into a container having a liquid medium relatively highly saturated with said constituent, passing the exit gases from said treatments into a third container having a liquid medium saturated with said absorbable constituent to a point between said slight and high saturations, continuing said process to constantly increase the saturations of each of said liquid mediums until one of said mediums reaches a predetermined degree of saturation, then drawing and recharging said second mentioned container with an absorptive liquid, and then changing the feeding of the gas to pass one part into said recharged container, another part into said third container and the exit gases from these treatments into the first mentioned container.

8. A process of absorption in a liquid medium comprising providing a hydrocarbon gas consisting of a mixture of constituents, dividing said liquid medium into a plurality of separate batches, two of said batches having relatively lower rates of absorption for a constituent of said mixture absorbable in said liquid and a remaining batch having a relatively higher rate of absorption therefor, passing said gas in contact with said two batches simultaneously in parallel and then passing separate portions of the exit gases from said treatment in contact with said remaining batch.

9. A process of absorption in a liquid medium comprising providing a hydrocarbon gas consisting of a mixture of constituents, dividing said liquid medium into batches having relatively high and relatively low saturations with a constituent of said mixture absorbable in said liquid, passing a portion of said gas in contact with said batch having relatively low saturation, and then passing the exit gas from said treatment in contact with said batch having relatively high saturation, and continuing said treatments until the batch having relatively low saturation corresponds in saturation to that of the other batch at the beginning of the treatment.

10. A process of absorption in a liquid medium comprising providing a hydrocarbon gas containing a mixture of constituents, passing one portion of said gas in contact with said liquid having a lower content of a constituent of said mixture absorbable in said liquid, passing another portion of said gas in contact with said liquid having a higher content of said absorbable constituent, and then passing the exit gas from said previous treatments in contact with said liquid having an intermediate content of said absorbable constituent.

11. A process of absorption in a liquid medium comprising providing a hydrocarbon gas containing a mixture of constituents, passing one portion of said gas in contact with said liquid having a lower content of a constituent of said mixture absorbable in said liquid, passing another portion of said gas in contact with said liquid having a higher content of said absorbable constituent, then passing the exit gas from said previous treatments in contact with said liquid having an intermediate content of said absorbable constituent, and continuing said treatments until one of the contents of the absorbable constituent exceeds a predetermined amount.

KENNETH E. STUART.